US012627461B2

(12) United States Patent
Grover

(10) Patent No.: US 12,627,461 B2
(45) Date of Patent: May 12, 2026

(54) SIGNAL SYNCHRONIZATION AND PAYLOAD EXTRACTION IN A COMMUNICATION NETWORK OR OTHER NETWORK

(71) Applicant: Raytheon Applied Signal Technology, Inc., San Jose, CA (US)

(72) Inventor: Michael H. Grover, Farmington, UT (US)

(73) Assignee: Raytheon Applied Signal Technology, Inc., San Jose, CA (US)

( * ) Notice: Subject to any disclaimer, the term of this patent is extended or adjusted under 35 U.S.C. 154(b) by 314 days.

(21) Appl. No.: 18/320,749

(22) Filed: May 19, 2023

(65) Prior Publication Data

US 2024/0388415 A1     Nov. 21, 2024

(51) Int. Cl.
H04L 7/00 (2006.01)
H04Q 11/00 (2006.01)

(52) U.S. Cl.
CPC ....... H04L 7/0075 (2013.01); H04Q 11/0067 (2013.01); H04Q 2011/0088 (2013.01)

(58) Field of Classification Search
CPC ........... H04Q 11/0066; H04Q 11/0067; H04Q 2011/0086
See application file for complete search history.

(56) References Cited

U.S. PATENT DOCUMENTS

| | | | | |
|---|---|---|---|---|
| 7,941,055 B2 * | 5/2011 | Huang | ......... | H04J 3/1694 359/344 |
| 9,762,380 B2 | 9/2017 | Prause | | |
| 9,847,832 B2 | 12/2017 | Prause | | |
| 10,742,317 B2 | 8/2020 | Prause | | |
| 11,388,494 B2 * | 7/2022 | Lefevre | ......... | H04L 1/0042 |
| 2013/0064539 A1 * | 3/2013 | Hood | ......... | H04Q 11/0067 398/67 |
| 2014/0093243 A1 * | 4/2014 | Dui | ......... | H04J 3/0608 398/58 |

(Continued)

FOREIGN PATENT DOCUMENTS

WO        WO-9430028 A1 * 12/1994   ......... H04L 49/3081

OTHER PUBLICATIONS

Hesse, "The emerging PON technologies accelerating worldwide gigabit deployment," Broadband Forum, Nov. 2021, 7 pages.

(Continued)

*Primary Examiner* — Nathan M Cors

(57)        ABSTRACT

A method includes obtaining, at a specified device, one or more bandwidth maps contained in communications in a first direction along a transmission medium. Each bandwidth map identifies when one or more other devices are allowed to communicate in a second direction opposite the first direction along the transmission medium. The method also includes using the one or more bandwidth maps to identify expected features of communications from the one or more other devices in the second direction along the transmission medium. The method further includes identifying actual features of the communications from the one or more other devices in the second direction along the transmission medium. In addition, the method includes synchronizing the specified device with the communications from the one or more other devices using the expected and actual features.

20 Claims, 7 Drawing Sheets

(56) References Cited

U.S. PATENT DOCUMENTS

2022/0369007 A1* 11/2022 Chung ............... H04Q 11/0067
2024/0236532 A1* 7/2024 Liu .................... H04Q 11/0067
2025/0096920 A1* 3/2025 Strobel ................ H04J 3/1694

OTHER PUBLICATIONS

Pan et al., "Understand GPON Technology," Cisco, TechNotes, Document ID 216230, Nov. 2022, 20 pages.

* cited by examiner

400

STORAGE
DEVICES

MEMORY

460

PROCESSING DEVICE

452

PERSISTENT
STORAGE

462

454

COMMUNICATIONS
UNIT

456

INPUT/OUTPUT
UNIT

458

SIGNAL SYNCHRONIZATION AND PAYLOAD EXTRACTION IN A COMMUNICATION NETWORK OR OTHER NETWORK

GOVERNMENT RIGHTS

This invention was made with government support under contract number XX-21112200001 awarded by the United States government. The government has certain rights in the invention.

TECHNICAL FIELD

This disclosure relates generally to communication systems. More specifically, this disclosure relates to signal synchronization and payload extraction in a communication network, such as a gigabit passive optical network (GPON), or other network.

BACKGROUND

Gigabit passive optical networks (GPONs), which are detailed in ITU-T Recommendation G.984.3 (referred to as the "GPON specification"), typically include multiple optical network units (ONUs) that communicate with an optical line terminal (OLT) over one or more common optical fibers. Optical transmissions from the optical network units occur in tightly-scheduled bursts in order to keep the optical network units from simultaneously transmitting optical signals and interfering with each other. To support this, the optical line terminal periodically communicates a schedule and burst frame format to the optical network units so that the optical network units are able to determine when and how their communications to the optical line terminal should occur. Orderly scheduling of the communications from the optical network units typically involves knowledge of the range (distance) between the optical line terminal and each optical network unit. This allows the optical line terminal to schedule communications from the optical network units while accounting for various delays associated with propagation of optical signals through different lengths of optical fibers between the optical line terminal and the optical network units.

SUMMARY

This disclosure relates to signal synchronization and payload extraction in a communication network, such as a gigabit passive optical network (GPON), or other network. While the following discussion often focuses on GPON networks to explain various aspects of the methods, devices, and systems of this disclosure, it should be appreciated that the scope of this disclosure is not limited to GPON networks, and those skilled in the art will appreciate that the disclosed techniques may be implemented in many suitable communication networks or other networks. For example, the methods, devices, and systems of this disclosure are suitable for use with many wired and wireless networks, such as optical and radio frequency (RF) communication networks, which may leverage time division multiplexing (TDM) schemes and/or other shared medium access protocols to facilitate communications.

In a first embodiment, a method includes obtaining, at a specified device, one or more bandwidth maps contained in communications in a first direction along a transmission medium. Each bandwidth map identifies when one or more other devices are allowed to communicate in a second direction opposite the first direction along the transmission medium. The method also includes using the one or more bandwidth maps to identify expected features of communications from the one or more other devices in the second direction along the transmission medium. The method further includes identifying actual features of the communications from the one or more other devices in the second direction along the transmission medium. In addition, the method includes synchronizing the specified device with the communications from the one or more other devices using the expected and actual features.

In a second embodiment, an apparatus includes at least one interface configured to be coupled to a transmission medium. The apparatus also includes at least one processing device configured to obtain one or more bandwidth maps contained in communications in a first direction along the transmission medium. Each bandwidth map identifies when one or more other devices are allowed to communicate in a second direction opposite the first direction along the transmission medium. The at least one processing device is also configured to use the one or more bandwidth maps to identify expected features of communications from the one or more other devices in the second direction along the transmission medium. The at least one processing device is further configured to identify actual features of the communications from the one or more other devices in the second direction along the transmission medium. In addition, the at least one processing device is configured to synchronize with the communications from the one or more other devices using the expected and actual features.

In a third embodiment, a non-transitory machine readable medium contains instructions that when executed cause at least one processor to obtain one or more bandwidth maps contained in communications in a first direction along a transmission medium. Each bandwidth map identifies when one or more other devices are allowed to communicate in a second direction opposite the first direction along the transmission medium. The non-transitory machine readable medium also contains instructions that when executed cause the at least one processor to use the one or more bandwidth maps to identify expected features of communications from the one or more other devices in the second direction along the transmission medium. The non-transitory machine readable medium further contains instructions that when executed cause the at least one processor to identify actual features of the communications from the one or more other devices in the second direction along the transmission medium. In addition, the non-transitory machine readable medium contains instructions that when executed cause the at least one processor to synchronize with the communications from the one or more other devices using the expected and actual features.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
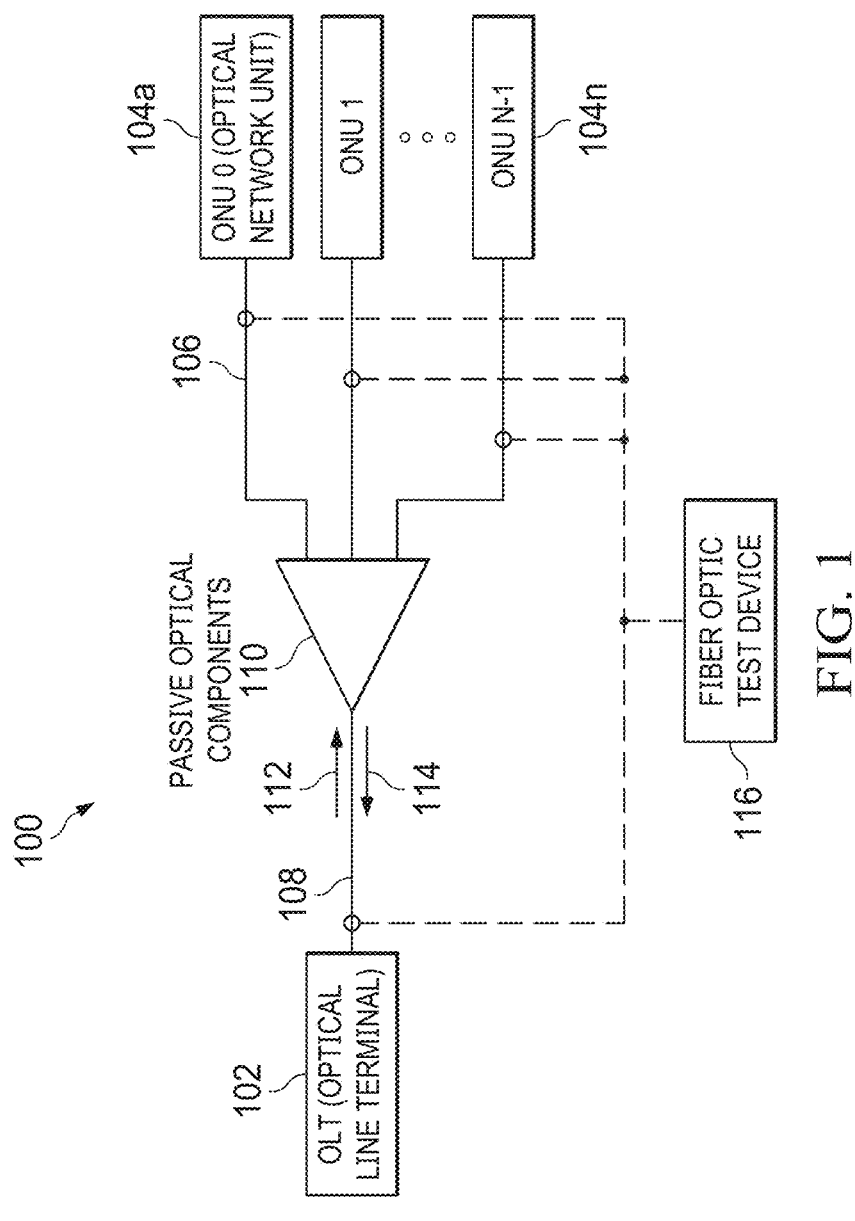
FIG. 1 illustrates an example system for signal synchronization and payload extraction in a gigabit passive optical network (GPON) or other network according to this disclosure.

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, gigabit passive optical networks (GPONs), which are detailed in ITU-T Recommendation G.984.3 (referred to as the "GPON specification"), typically include multiple optical network units (ONUs) that communicate with an optical line terminal (OLT) over one or more common optical fibers. Optical transmissions from the optical network units occur in tightly-scheduled bursts in order to keep the optical network units from simultaneously transmitting optical signals and interfering with each other. To support this, the optical line terminal periodically communicates a schedule and burst frame format to the optical network units so that the optical network units are able to determine when and how their communications to the optical line terminal should occur. Orderly scheduling of the communications from the optical network units typically involves knowledge of the range (distance) between the optical line terminal and each optical network unit. This allows the optical line terminal to schedule communications from the optical network units while accounting for various delays associated with propagation of optical signals through different lengths of optical fibers between the optical line terminal and the optical network units.

It is relatively easy for the ranges between the optical line terminal and the various optical network units to be determined with high accuracy. For instance, a special handshaking protocol may be used whenever an optical network unit enters the network, and the handshaking protocol can allow the optical line terminal to estimate the range to that optical network unit. However, there are some situations in which ranging information is not available for use by other components in a gigabit passive optical network or other network. For example, it may be necessary or desirable for a user to attach a fiber optic test device or other diagnostic/test equipment to an optical fiber in order to diagnose problems in a network or confirm proper operation of components in the network. Passively-observing diagnostic/test equipment may represent equipment that merely receives and processes optical signals or other communications without actively transmitting signals over an optical fiber or other transmission medium. Often times, passively-observing diagnostic/test equipment may be coupled to optical fibers or other transmission media in a network at arbitrary locations, and the specific ranges between the diagnostic/test equipment and the optical line terminal and optical network units at those locations may not be known with precision.

While passively-observing diagnostic/test equipment may be capable of extracting optical network unit scheduling information from transmissions from an optical line terminal, it is difficult for passively-observing diagnostic/test equipment to properly analyze received optical signals or other signals from optical network units without knowledge of the range to the optical line terminal and each optical network unit. A straightforward approach to extracting information from optical network unit transmissions may be to attempt to analyze the data in these transmissions directly without use of transmissions from the optical line terminal. In this scenario, the diagnostic/test equipment would analyze data bit-by-bit in an attempt to decipher burst formatting and to extract burst information. However, because of the flexible nature of the formatting of these bursts, this "brute-force" approach typically requires multiple analysis passes through captured signals using one or more high-speed processors and large amounts of storage and processing resources to establish confidence in the resultant decoding. As data rates continue to increase, the brute-force approach will also likely require significant increases in the size, weight, power, and cost of the diagnostic/test equipment.

This disclosure provides techniques for signal synchronization and payload extraction in a gigabit passive optical network or other network. As described in more detail below, a fiber optic test device, other diagnostic/test equipment, or other device can obtain one or more bandwidth maps from optical or other communications occurring in one direction over an optical fiber or other transmission medium, such as in the "downstream" direction from an optical line terminal to one or more optical network units. The device can use the one or more bandwidth maps to identify expected features of communications that are scheduled to occur in the opposite direction over the optical fiber or other transmission medium, such as in the "upstream" direction from each optical network unit to the optical line terminal. The device can obtain actual communications in the upstream direction and compare features of the actual communications to the expected features. Once a match between the actual and expected features is found, the device can obtain synchronization with the communications occurring over the transmission medium, such as between the optical line terminal and the optical network unit(s). At that point, the device can extract data payloads from communication bursts or perform other functions.

In this way, the fiber optic test device, other diagnostic/test equipment, or other device supports a novel approach for synchronizing the device to optical or other communications and for extracting data payloads being transmitted over optical fibers or other transmission media. For example, the GPON specification only addresses the implementation of a functional network for data transport and does not anticipate or address the notion of an intermediary passive observer (such as a fiber optic test device or other diagnostic/test equipment) being inserted into an arbitrary point of the network. Moreover, the fiber optic test device, other diagnostic/test equipment, or other device can support a computationally-efficient real-time approach for performing signal synchronization and payload extraction by using information extracted from downstream signals to process upstream signals more effectively. Further, the fiber optic test device, other diagnostic/test equipment, or other device can be implemented with one or more of reduced size, weight, power, or cost compared to devices that implement brute-force approaches. In addition, the fiber optic test device, other diagnostic/test equipment, or other device may be implemented as a passive observer, which allows the device to properly process data without interfering with other equipment on the network. Note that while the techniques described below are often described as being used in or with a gigabit passive optical network, the techniques described below may be used in or with any other suitable optical network or other network.

FIG. 1 illustrates an example system 100 for signal synchronization and payload extraction in a gigabit passive optical network (GPON) or other network according to this disclosure. As shown in FIG. 1, the system 100 includes an optical line terminal (OLT) 102 and one or more optical network units 104a-104n. The optical network units 104a-104n represent devices that can engage in optical communications with the optical line terminal 102 and that may be coupled to, communicate with, or include other components that rely on or use the optical communications. The optical network units 104a-104n may also support conversion between optical and electrical signaling, which allows electrical components to be coupled to or otherwise communicate via the optical network units 104a-104n. Note that any suitable number of optical network units 104a-104n may be used here. In some embodiments, for instance, a single optical line terminal 102 may be coupled to between one and 128 optical network units 104a-104n, although other embodiments are also possible. The optical line terminal 102 represents a device that can aggregate communications from the optical network units 104a-104n for further communication, such as via an optical or electrical link.

The optical line terminal 102 is coupled to the optical network units 104a-104n in this example via optical fibers 106, 108 and one or more passive optical components 110. For example, each optical network unit 104a-104n may be coupled to the passive optical component(s) 110 via its own optical fiber 106, and at least one common optical fiber 108 may couple the passive optical component(s) 110 to the optical line terminal 102. The one or more passive optical components 110 represent any suitable component(s) that passively direct optical signals to and from the optical line terminal 102 and the optical network units 104a-104n. For instance, the one or more passive optical components 110 may include one or more passive optical splitters/combiners that are used to split optical signals from the optical line terminal 102 for delivery to the optical network units 104a-104n and to combine optical signals from the optical network units 104a-104n for delivery to the optical line terminal 102. Because the network is passive in this example, the optical line terminal 102 and the optical network units 104a-104n may represent the only components that actively transmit and receive optical signals through optical fibers or process data.

Communications between the optical line terminal 102 and the optical network units 104a-104n here are shown to occur in a downstream direction 112 and in an upstream direction 114. The downstream direction 112 generally represents communications from the optical line terminal 102 to the optical network units 104a-104n, and the upstream direction 114 generally represents communications from the optical network units 104a-104n to the optical line terminal 102. Because intermediate network components are passive in this example, the optical network units 104a-104n receive the same downstream data from the optical line terminal 102. Note that the terms "downstream" and "upstream" here are used merely as a matter of convenience and do not impose any specific requirements on the communications.

As noted above, transmissions by the optical network units 104a-104n to the optical line terminal 102 in the upstream direction 114 typically occur in tightly-scheduled bursts in order to keep the optical network units 104a-104n from simultaneously transmitting optical signals. If that occurs, the optical signals would be combined onto the optical fiber(s) 108 and interfere with each other. To help ensure that the optical line terminal 102 does not receive upstream data from multiple optical network units 104a-104n at the same time, the optical line terminal 102 implements a scheduling mechanism that allows the optical network units 104a-104n to transmit during discrete time intervals called bursts. In GPON, the optical line terminal 102 is responsible for communicating scheduling information to the optical network units 104a-104n as part of its communications in the downstream direction 112. This scheduling information can take the form of one or more bandwidth maps, each of which can identify when one or more of the optical network units 104a-104n are scheduled to transmit signals to the optical line terminal 102.

In this example, a fiber optic test device 116 represents diagnostic/test equipment or other equipment that can be coupled to one or more optical fibers 106, 108 or other components of the GPON or other network. Examples of positions where the fiber optic test device 116 may be coupled to one or more optical fibers 106, 108 are shown in FIG. 1. In some cases, the fiber optic test device 116 may be used to analyze traffic or other characteristics of the system 100 in order to diagnose problems in the system 100 or confirm proper operation of components in the system 100. For example, the fiber optic test device 116 may be used to sample optical signals being transported over one or more optical fibers 106, 108 in order to determine whether other components 102, 104a-104n, 106, 108 of the system 100 are operating as expected or in an unexpected manner.

As noted above, one issue that can affect the fiber optic test device 116 involves the fiber optic test device 116 being able to be connected to the GPON or other network at an arbitrary point within the system 100. As a result, the distance (range) between the fiber optic test device 116 and any of the optical line terminal 102 and optical network units 104a-104n may not be known with precision. As described below, the fiber optic test device 116 implements techniques that allow the fiber optic test device 116 to use one or more bandwidth maps transmitted in the downstream direction 112 to identify expected features associated with communications in the upstream direction 114. The fiber optic test device 116 also identifies actual features of actual communications in the upstream direction 114, compares the actual features and the expected features, and obtains synchronization with the communications in the upstream direction 114 based on the comparison. This allows the fiber optic test device 116 to establish synchronization and perform other functions like payload extraction much faster and much more efficiently compared to brute-force approaches.

Note that the fiber optic test device 116 may represent or include any suitable device(s) designed to operate, at least in part, by extracting payload data or other information sent in the upstream direction 114 for analysis, storage, or other use. Various types of testing, diagnostic, or other analysis devices may be used by or in the fiber optic test device 116. As a particular application of this approach, the use of microwave-based backhaul links may become impractical in various cellular systems (like 5G systems) or other wireless communication systems as the number of backhaul links increases. Passive optical network-based approaches offer high bandwidths and can be used to inexpensively replace or supplement microwave-based backhaul links. In these or other systems that incorporate passive optical network-based approaches, one or more fiber optic test devices 116 may be used to verify operations and diagnose faults or other problems in the passive optical networks.

Although FIG. 1 illustrates one example of a system 100 for signal synchronization and payload extraction in a gigabit passive optical network or other network, various changes may be made to FIG. 1. For example, various components and functions in each of FIG. 1 may be combined, further subdivided, replicated, omitted, or rearranged and additional components and functions may be added according to particular needs. As a particular example, the system 100 may include any suitable number of optical line terminals 102, and each optical line terminal 102 may be coupled to any suitable number of optical network units 104a-104n. Also, while the techniques for signal synchronization and payload extraction are described here in the context of use by a fiber optic test device 116 in a gigabit passive optical network, these techniques may be used by any other suitable device(s) and in any other suitable network(s). Other non-limiting examples of networks that may be used here include ITU-T G.983 asynchronous transfer mode (ATM) passive optical networks (APON) and broadband passive optical networks (BPON), symmetrical and asymmetrical ITU-T G.987 10-Gigabit-capable passive optical networks (XG-PON), ITU-T G.9807 10-Gigabit-capable symmetric passive optical networks (XGS-PON), ITU-T G.989 40-Gigabit-capable passive optical networks (NG-PON2), time and wavelength division multiplexed PON networks (G.hsp.TWDM), and 50-Gigabit-capable passive optical networks (G.HSP.50G).

Figures 2, 3:
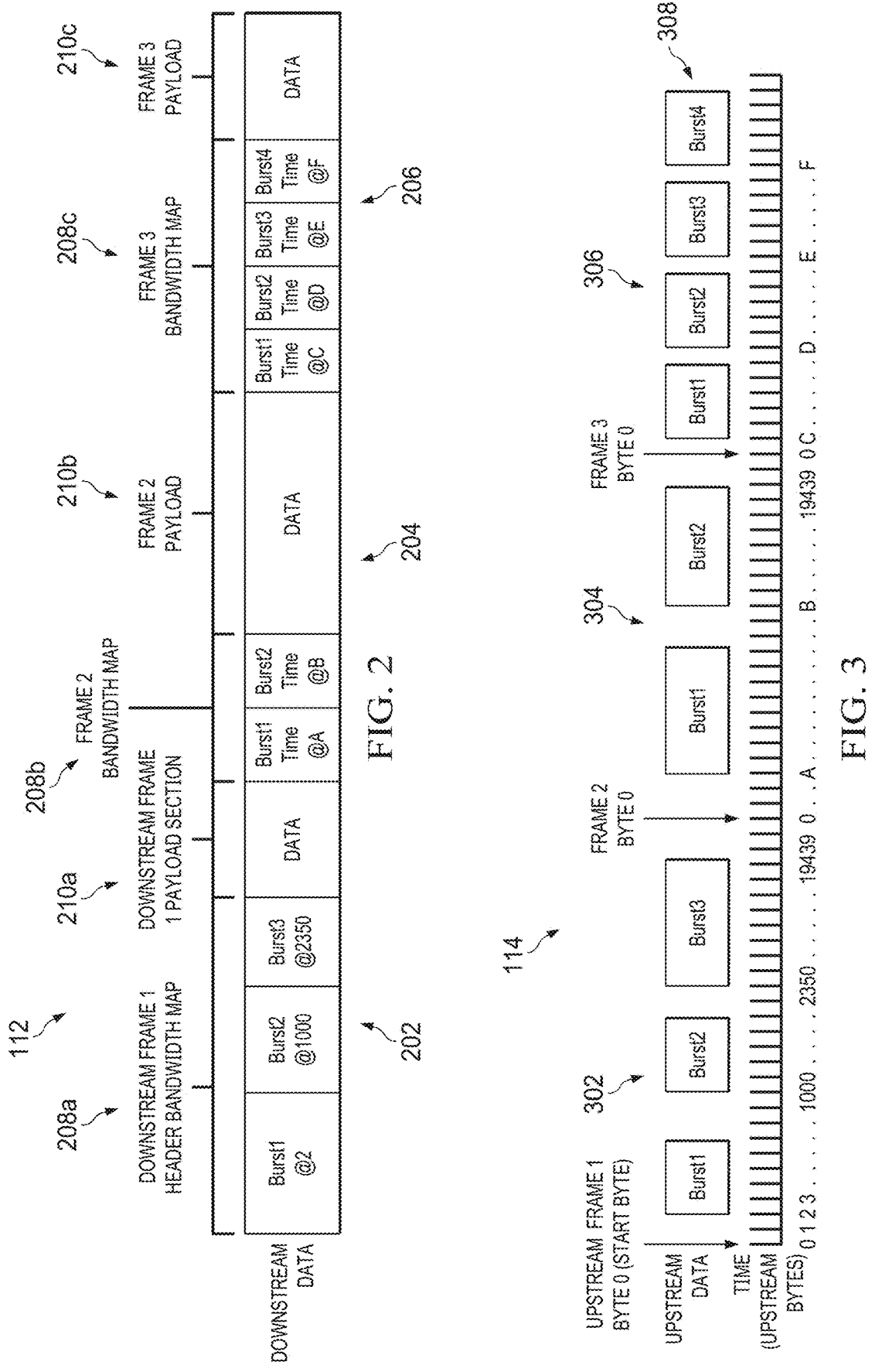
FIGS. 2 and 3 illustrate example communications in a gigabit passive optical network or other network according to this disclosure.

FIGS. 2 and 3 illustrate example communications in a gigabit passive optical network or other network according to this disclosure. More specifically, FIG. 2 illustrates example communications that may occur in the downstream direction 112 within the system 100 of FIG. 1, and FIG. 3 illustrates example communications that may occur in the upstream direction 114 within the system 100 of FIG. 1. Note that these communications are examples only, and the specific contents and arrangements of the communications in the downstream and upstream directions 112, 114 can vary depending on a number of factors (such as the design of the system 100).

As shown in FIG. 2, communications in the downstream direction 112 from the optical line terminal 102 to the optical network units 104a-104n include data sent continuously in frames. In this example, three frames 202-206 are shown. Each frame 202-206 includes a bandwidth map and a data payload. Since three frames 202-206 are shown here, there are three bandwidth maps 208a-208c and three data payloads 210a-210c shown in FIG. 2. In some embodiments, each frame 202-206 represents a 38880-byte frame and may be 125 μs in length, although other sizes and durations are possible.

Each bandwidth map 208a-208c identifies when one or more of the optical network units 104a-104n will transmit optical signals to the optical line terminal 102 in the upstream direction 114. In this example, each bandwidth map 208a-208c is shown as including one or more entries, where each entry identifies one of the optical network units 104a-104n and the time slot in which that optical network unit 104a-104n can transmit. Note that the contents of each bandwidth map 208a-208c are shown here in this form for simplicity, and each bandwidth map 208a-208c may use any suitable data structure(s) to define which optical network units 104a-104n transmit and when those optical network units 104a-104n transmit. Each bandwidth map 208a-208c may also include other information used to properly decode upstream bursts. Each data payload 210a-210c represents data that is transmitted to all of the optical network units 104a-104n in the downstream direction 112. The information in each data payload 210a-210c may be intended for use by one, some, or all of the optical network units 104a-104n, but each data payload 210a-210c is received by all of the optical network units 104a-104n due to the passive nature of the network shown in FIG. 1.

As shown in FIG. 3, communications in the upstream direction 114 from the optical network units 104a-104n to the optical line terminal 102 include data sent in frames. In this example, three frames 302-306 are shown. Each frame 302-306 includes zero or more bursts 308, and each burst 308 represents a transmission from one of the optical network units 104a-104n to the optical line terminal 102. Gaps are present between consecutive bursts 308 and represent periods when no optical network unit 104a-104n is transmitting to the optical line terminal 102. In some embodiments, each frame 302-306 represents a 19440-byte frame and may be 125 μs in length, although other sizes and durations are possible. Note that while the frames 202-206, 302-306 may have a common duration, the frames 202-206 often start and end at different times relative to the frames 302-306.

As can be seen here, the bursts 308 in each frame 302-306 occur in accordance with the bandwidth map 208a-208c associated with that frame 302-306. Thus, for instance, the first frame 302 includes three bursts 308 at time slots 2, 1000, and 2350, which matches the contents of the bandwidth map 208a of the frame 202. The second frame 304 includes two bursts 308 at time slots A and B, which matches the contents of the bandwidth map 208b of the frame 204. The third frame 306 includes four bursts 308 at time slots C, D, E, and F, which matches the contents of the bandwidth map 208c of the frame 206. The communications shown in FIGS. 2 and 3 can occur during numerous frames in order to provide data between the optical network units 104a-104n and the optical line terminal 102.

As described below, the fiber optic test device 116 can use the contents of the bandwidth maps 208a-208c sent in the downstream direction 112 in order to identify expected features for communications in the upstream direction 114. The fiber optic test device 116 can compare actual features of actual communications in the upstream direction 114 to the expected features, which allows the fiber optic test device 116 to identify when the bursts 308 should be occurring in the upstream direction 114. Among other things, this allows the fiber optic test device 116 to synchronize itself with the communications in the upstream direction 114 and perform payload extraction or other functions related to the communications in the upstream direction 114.

Although FIGS. 2 and 3 illustrate examples of communications in a gigabit passive optical network or other network, various changes may be made to FIGS. 2 and 3. For example, the bursts 308 in the upstream direction 114 and defined in the downstream direction 112 can easily vary based on the number of optical network units 104a-104n and the data to be transmitted by the optical network units 104a-104n.

Figure 4A:
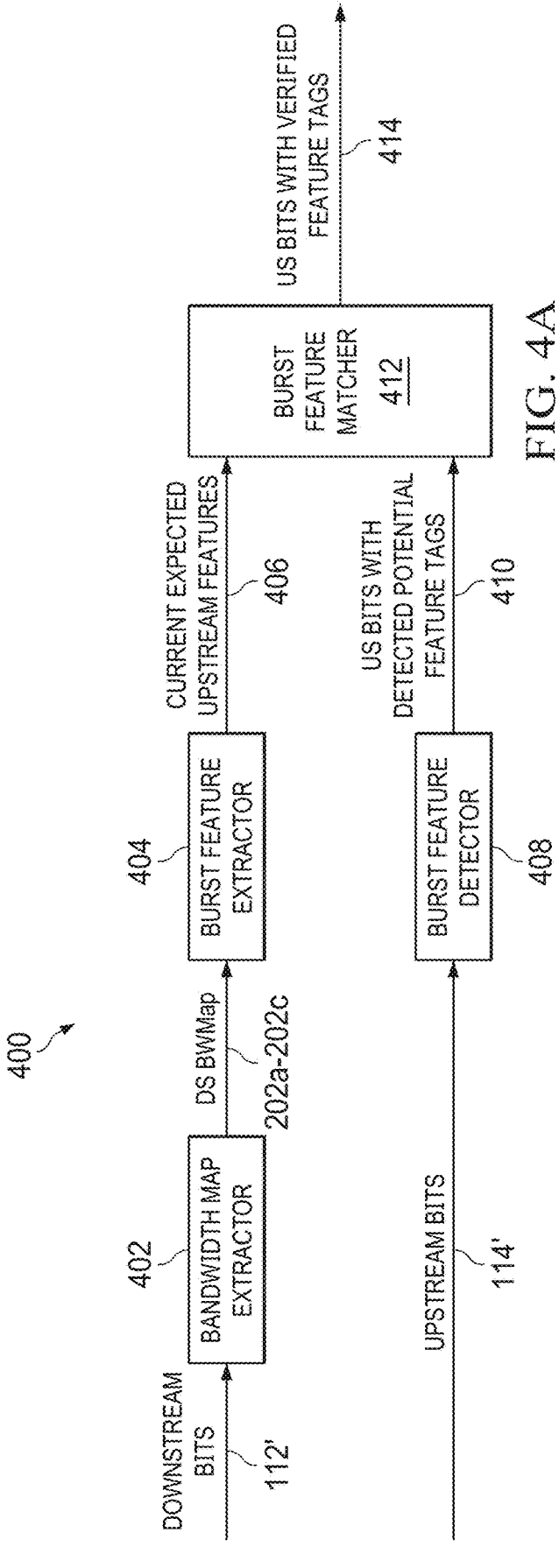
FIGS. 4A and 4B illustrate an example device for signal synchronization and payload extraction in a gigabit passive optical network or other network according to this disclosure.
Figure 4B:
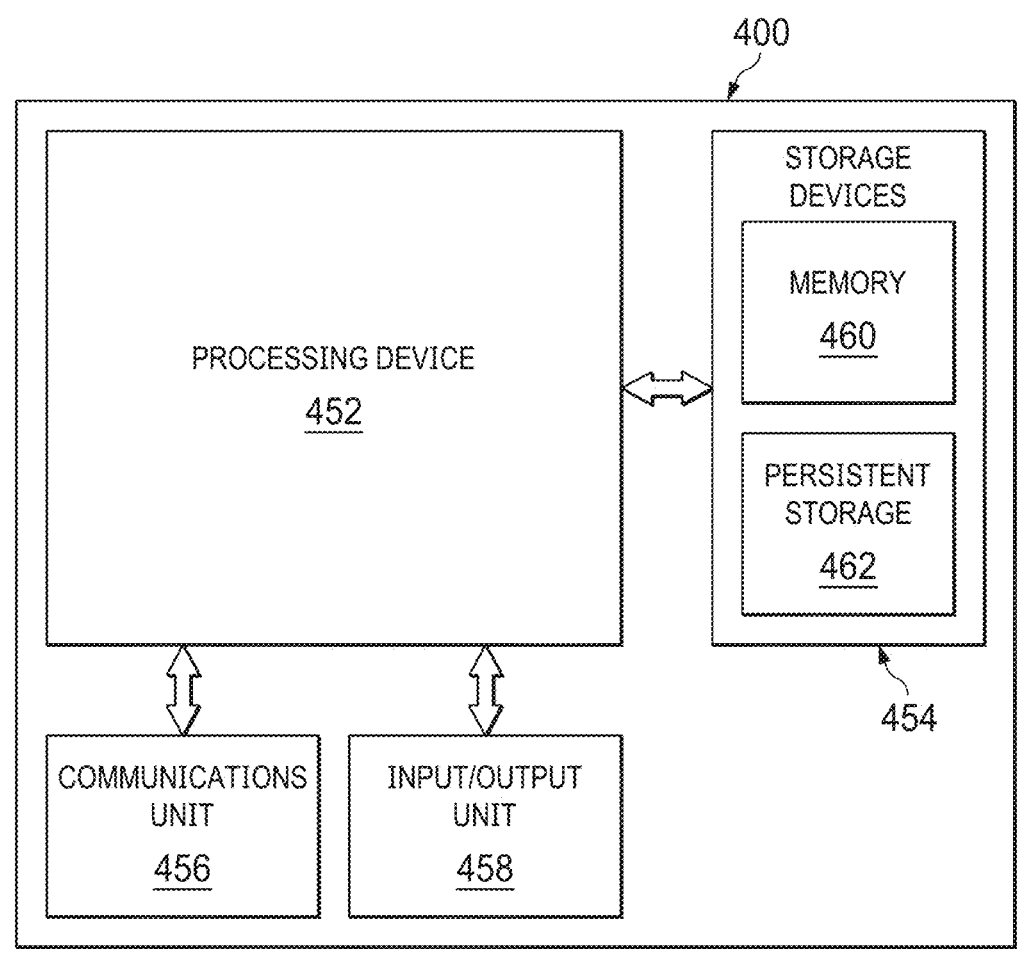

FIGS. 4A and 4B illustrate an example device 400 for signal synchronization and payload extraction in a gigabit passive optical network or other network according to this disclosure. The device 400 may, for example, represent logical and physical implementation details associated with the fiber optic test device 116 or other device used to perform signal synchronization and payload extraction in a gigabit passive optical network or other network. For ease of explanation, the device 400 is described as representing the fiber optic test device 116 in the system 100 of FIG. 1. However, the device 400 may represent any other suitable device and be used in any other suitable system.

As shown in FIG. 4A, the device 400 generally operates by receiving a stream of downstream bits 112' recovered in the downstream direction 112 and a stream of upstream bits 114' recovered in the upstream direction 114. The stream of downstream bits 112' represents data being transmitted by the optical line terminal 102 and is provided to a bandwidth map extractor 402, which operates to identify and extract bandwidth maps 208a-208c from the data being sent in the downstream direction 112. As noted above, each bandwidth map 208a-208c contains or represents one or more data structures identifying information about burst scheduling in the upstream direction 114 and features within each burst 308 that can be used to decode that burst 308.

The bandwidth maps 208a-208c are provided to a burst feature extractor 404, which processes the bandwidth maps 208a-208c in order to identify expected features 406 of bursts 308 to be received in the upstream direction 114. For example, the burst feature extractor 404 may process the bandwidth map 208a-208c for each frame 202-206 and identify features 406 that are expected of the bursts 308 to be received in the corresponding frame 302-306. Note that the burst feature extractor 404 can identify both the expected features 406 of the bursts 308 and the exact times that the bursts 308 or the features 406 should arrive in the upstream direction 114 within their respective upstream frames. These features 406 may be temporarily stored, such as in a memory of the fiber optic test device 116. Because of the flexibility allowed for scheduling of bursts in GPON or other networks, each set of expected features 406 can be used to create a type of distinct feature fingerprint that an upstream signal needs to match in order to achieve synchronization. The feature fingerprint may be said to represent a match filter or burst profile to be matched to the upstream signal. The burst feature extractor 404 can identify any suitable features associated with the bandwidth maps 208a-208c. As particular examples, the expected features 406 may include start of frame features, physical layer operation administration and maintenance upstream (PLOAMu) features, dynamic bandwidth report upstream (DBRu) features, and GPON encapsulation method (GEM) features.

The stream of upstream bits 114' is provided to a burst feature detector 408, which processes the upstream bits 114' in order to identify actual features 410 of the bursts 308 that are received in the upstream direction 114. For example, the burst feature detector 408 may process the upstream bits 114' for each frame 302-306 and identify features 410 that actually appear in the corresponding frame 302-306. The burst feature detector 408 can also mark the locations of these actual features 410 in the upstream bits 114', such as by marking each actual feature 410 with a label and a time slot in which the actual feature 410 is detected or begins. The burst feature detector 408 can identify any suitable features associated with the upstream bits 114'. As particular examples, the actual features 410 may include start of frame features, PLOAMu features, DBRu features, and GEM features. Labels representing the actual features 410 associated with the upstream bits 114' may sometimes be referred to as tags.

A burst feature matcher 412 operates to compare the expected features 406 and the actual features 410 in order to determine how the expected features 406 align with the actual features 410. In other words, the burst feature matcher 412 compares the feature fingerprints (as defined by the expected features 406 and extracted from the bandwidth maps 208a-208c) to the actual features 410 extracted from the upstream bits 114'. The burst feature matcher 412 attempts to align the actual features 410 of the upstream bits 114' with the expected features 406. Once this alignment is achieved, the burst feature matcher 412 achieves synchronization with the upstream communications, and the burst feature matcher 412 can produce an output 414 containing the upstream bits 114' as labeled or tagged with correct features. One example of the operations of the burst feature matcher 412 is described below with reference to FIGS. 5 and 6. Once signal synchronization has been obtained, the expected features 406 derived from the bandwidth maps 208a-208c can be used to decode the bursts 308 from each of the optical network units 104a-104n, allowing functions like payload extraction or payload processing to occur.

Note that, during the identification of the actual features 410 in the upstream data, it may be possible or probable that some features will be misidentified by the burst feature detector 408. In this context, "misidentified" encompasses both (i) false positive errors in which features 410 are identified as existing when they do not and (ii) false negative errors in which features 410 are not identified as existing when they should. This misidentification of features 410 can essentially create a "dirty fingerprint" for pattern matching and can result in diminished confidence in the matching operation performed by the burst feature matcher 412.

The misidentification of actual features 410 by the burst feature detector 408 may be due to a number of factors. For example, one impediment to correctly identifying the actual features 410 may include methodologies whose correct use and implementation may still incorrectly indicate the existence of features 410 (false positives). As particular examples, these methodologies may include using cyclic redundancy checks (CRCs) to identify PLOAMu features and DBRu features, which may result in misidentification of these features due to CRC collisions, misidentifying upstream burst bits as guard band data, misidentifying GEM headers due to header error control (HEC) parity collisions, and so on. Another impediment to proper feature identification may involve bit errors in the received upstream or downstream data. For instance, in the upstream data, bit errors may result in both false positives and false negatives when attempting to identify upstream burst features. In the downstream direction, bit errors may result in various miscommunications of expected burst features, burst positions, burst lengths, etc. Several mechanisms may be used to mitigate the possibility of bit errors, such as the application of one or multiple forward error correction (FEC) decoder iterations on the incoming upstream or downstream data to reduce or eliminate bit errors (if FEC is enabled on these signals). Yet another impediment to proper feature identification is if a fiber optic test device 116 is inserted into the network at a location outside of a common fiber optic trunk (represented by the optical fiber 108), such as at a point on a cable servicing a single ONU 104a-104n or at any other point where upstream data from fewer than all of the ONUs 104a-104n would be visible. In this condition, the fiber optic test device 116 may not receive the upstream bursts from non-visible ONUs 104a-104n.

Various mechanisms may be used to reduce or minimize uncertainties surrounding the feature matching functionality due to these or other impediments. These mechanisms may include but are not limited to (i) limiting feature sets in the actual features 410 to only include those allowed by the GPON specification or other specification (such as not marking data as a PLOAMu feature when it includes a message identifier not defined in the specification), (ii) limiting positive identification of PLOAMu and DBRu CRC codes to those without errors, (iii) limiting positive identification of potential GEM headers to those whose length fields are less than the conceivable length of a GEM frame within an upstream frame, and (iv) limiting identifying potential GEM headers to only those who are errorless or correctable according to the specification. One, some, or all of these mechanisms or other or additional mechanisms may be used depending on the implementation.

Despite efforts to limit misidentification of features, it may be possible or probable that actual features 410 in the upstream data will continue to be misidentified. Thus, in some embodiments, the burst feature matcher 412 may implement a confidence mechanism with one or more metrics whose threshold(s) need to be met before alignment is declared. For example, the burst feature matcher 412 may initially check whether the identified start locations of all upstream bursts align correctly with burst locations in the downstream bandwidth map. Among other things, this may allow for missing bursts from non-visible optical network units 104a-104n. Once a specified number M of upstream frames have passed in which no identified upstream burst start aligns with a non-existent expected burst start, the burst feature matcher 412 may proceed to declare alignment or check that identified PLOAMu features and associated ONU identifiers in the upstream burst header do not contradict what is expected for a specified number N of more upstream frames. Any other or additional technique(s) may be used that allow the burst feature matcher 412 to establish confidence in alignment.

It should be noted that the functions shown in or described with respect to FIG. 4A can be implemented in any suitable device(s) and in any suitable manner. For example, in some embodiments, at least some of the functions shown in or described with respect to FIG. 4A can be implemented or supported using one or more software applications or other software instructions that are executed by one or more processors of an electronic device. In other embodiments, at least some of the functions shown in or described with respect to FIG. 4A can be implemented or supported using dedicated hardware components. In general, the functions shown in or described with respect to FIG. 4A can be performed using any suitable hardware or any suitable combination of hardware and software/firmware instructions. Also, the functions shown in or described with respect to FIG. 4A can be performed by a single device or by multiple devices.

As shown in FIG. 4B, in some embodiments, the device 400 can be implemented using a computing device or system that includes at least one processing device 452, at least one storage device 454, at least one communications unit 456, and at least one input/output (I/O) unit 458. The processing device 452 may execute instructions that can be loaded into a memory 460. The processing device 452 includes any suitable number(s) and type(s) of processors or other processing devices in any suitable arrangement. Example types of processing devices 452 include one or more microprocessors, microcontrollers, digital signal processors (DSPs), application specific integrated circuits (ASICs), field programmable gate arrays (FPGAs), or discrete circuitry. In some embodiments, the processing device 452 can be used to perform the various functions shown in FIG. 4A and described above.

The memory 460 and a persistent storage 462 are examples of storage devices 454, which represent any structure(s) capable of storing and facilitating retrieval of information (such as data, program code, and/or other suitable information on a temporary or permanent basis). The memory 460 may represent a random access memory or any other suitable volatile or non-volatile storage device(s) The persistent storage 462 may contain one or more components or devices supporting longer-term storage of data, such as a read only memory, hard drive, Flash memory, or optical disc.

The communications unit 456 supports communications with other systems or devices. For example, the communications unit 456 can include an optical interface that allows the device 400 to receive and process optical signals, such as when the communications unit 456 can be coupled to an optical fiber 106, 108. The communications unit 456 may also be used to recover encoded data from the optical signals, such as when the communications unit 456 is used to generate the stream of downstream bits 112' and the stream of upstream bits 114'.

The I/O unit 458 allows for input and output of data. For example, the I/O unit 458 may provide a connection for user input through a keyboard, mouse, keypad, touchscreen, or other suitable input device. The I/O unit 458 may also send output to a display or other suitable output device. For example, the I/O unit 458 may be used to receive input from a user regarding one or more functions to be performed by the device 400 and to provide results of the one or more functions to the user. As particular examples, the I/O unit 458 may be used by the user to initiate one or more tests of a network and to display the results of the one or more tests.

Although FIGS. 4A and 4B illustrate one example of a device 400 for signal synchronization and payload extraction in a gigabit passive optical network or other network, various changes may be made to FIGS. 4A and 4B. For example, various components and functions in each of FIGS. 4A and 4B may be combined, further subdivided, replicated, omitted, or rearranged and additional components and functions may be added according to particular needs. Also, the logical implementation details associated with the device 400 as shown in FIG. 4A need not be used with the physical implementation details associated with the device 400 as shown in FIG. 4B (or vice versa).

Figure 5:
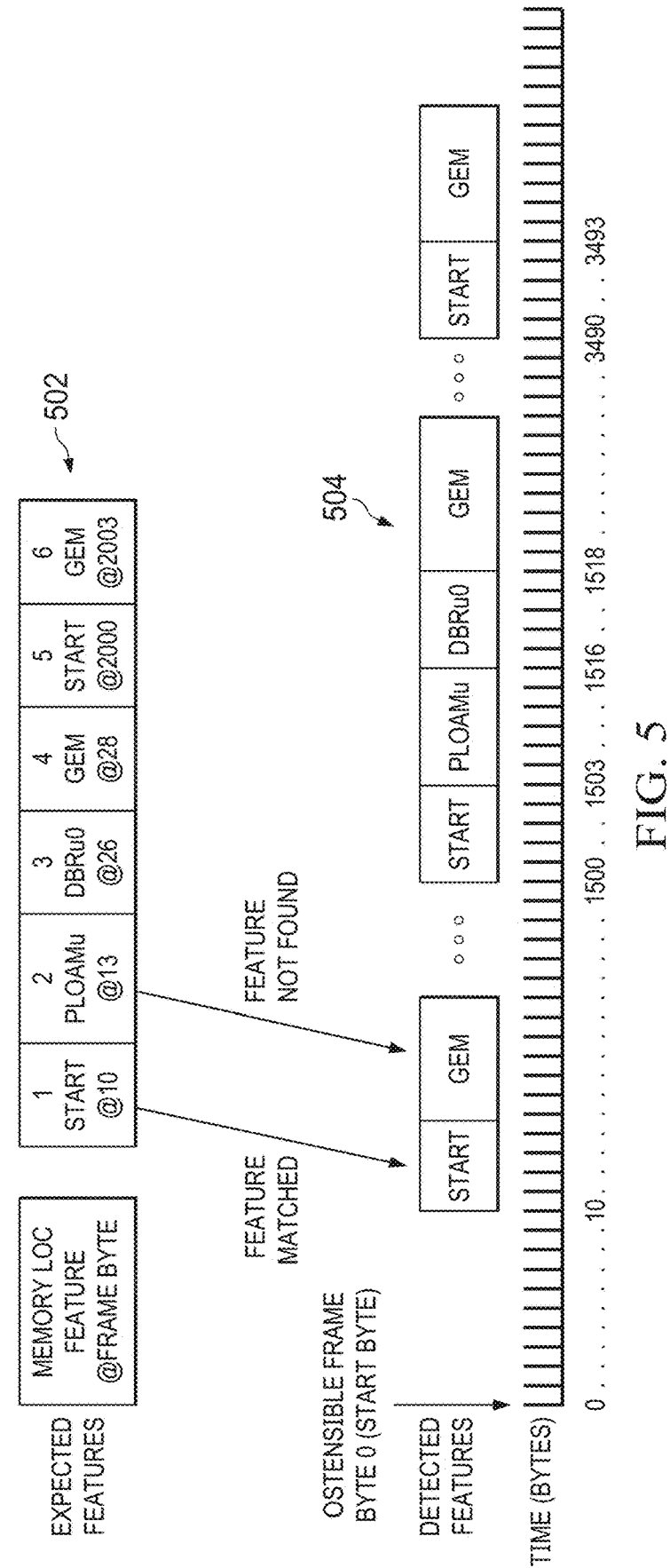
FIGS. 5 and 6 illustrate example signal synchronization and payload extraction attempts according to this disclosure.
Figure 6:
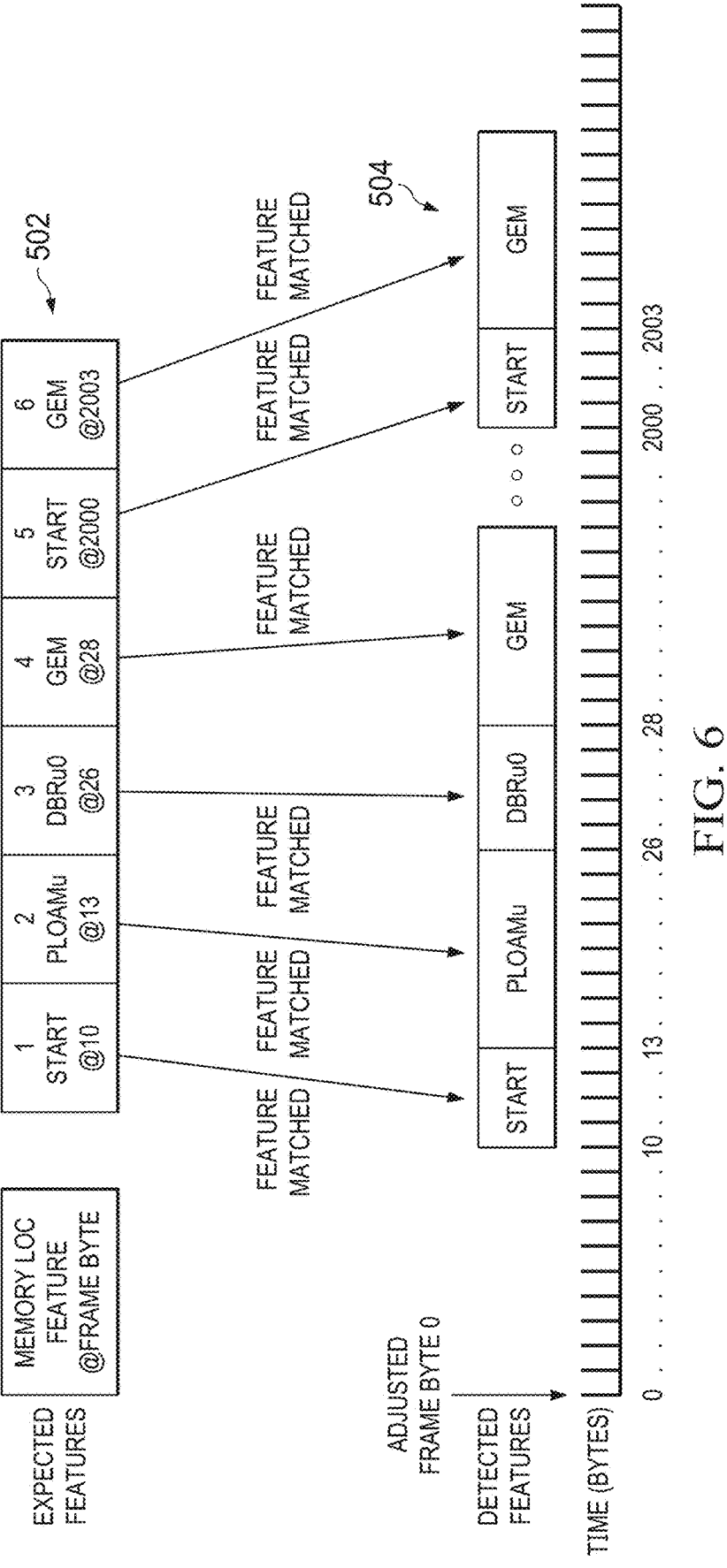

FIGS. 5 and 6 illustrate example signal synchronization and payload extraction attempts according to this disclosure. More specifically, FIGS. 5 and 6 illustrate examples of attempts by the burst feature matcher 412 of FIG. 4A to obtain signal synchronization based on the expected features 406 and the actual features 410. After signal synchronization is achieved, payload extraction or other functions can be performed. As shown in FIGS. 5 and 6, a mapping 502 represents the expected features 406 identified by the burst feature extractor 404 based on one or more of the bandwidth maps 208a-208c. As can be seen here, the mapping 502 includes a number of expected features 406 and the locations (time slots) when those expected features 406 should appear in the corresponding frame(s) 302-306 in the upstream direction 114. In this particular example, the expected features 406 include start of frame features, PLOAMu features, DBRu features, and GEM features.

In FIG. 5, a collection 504 of features represents the actual features 410 as determined by the burst feature detector 408 for one or more frames 302-306. As can be seen here, the burst feature matcher 412 can align the first start of frame feature in the collection at a time slot of 10, which (according to the mapping 502) is where the expected features 406 indicate the start of frame feature should be located. However, once aligned in this manner, the burst feature matcher 412 can quickly determine that the second feature in the collection 504 (a GEM feature) does not match the second feature identified in the mapping 502 (a PLOAMu feature). As a result, the burst feature matcher 412 is able to rapidly determine that the current alignment of the collection 504 shown in FIG. 5 is not correct since it does not match the expected features 406 as defined by the one or more bandwidth maps 208a-208c.

Since this alignment is not expected, the burst feature matcher 412 shifts the collection 504 of features so that the next start of frame feature occurs at the time slot of 10. This is shown in FIG. 6, where the collection 504 has been shifted to the left in time. Once aligned in this manner, the burst feature matcher 412 can quickly determine that the remaining features in the collection 504 match the other features identified in the mapping 502. As a result, the burst feature matcher 412 is able to rapidly determine that the current alignment of the collection 504 shown in FIG. 6 is correct since it matches the expected features 406 as defined by the one or more bandwidth maps 208a-208c. Thus, after a specified number of features 406 and 410 have been determined to match, a specified amount of time has passed in which the features 410 continue to match the features 406, or some other suitable criterion or criteria are met, the burst feature matcher 412 can declare that synchronization has been obtained. Once synchronization occurs, the burst feature matcher 412 can mark the upstream signal with all features in their correct locations so that the fiber optic test device 116 can properly interpret the upstream signal.

Although FIGS. 5 and 6 illustrate examples of signal synchronization and payload extraction attempts, various changes may be made to FIGS. 5 and 6. For example, the contents of the mapping 502 can easily vary based on the bandwidth maps 208a-208c that are sent in the downstream direction 112 and processed by the device 400. Also, the burst feature matcher 412 may initially detect zero, one, or multiple matches in features before identifying a mismatch between the features 406, 410. In addition, this represents an ideal scenario with no misidentified features. In other cases, there may be some misidentified features, and increasing confidence can be established as matches between the features increases over time.

Note that the use of start of frame, PLOAMu, DBRu, and GEM features represents one example way in which the bandwidth map extractor 402, burst feature extractor 404, burst feature detector 408, and burst feature matcher 412 may be used to obtain alignment. However, any other suitable feature or combination of features may be used to obtain alignment. For example, in other embodiments, the bandwidth map extractor 402 may extract start of burst features (defined as the first byte of an upstream burst header in an upstream burst) and PLOAMu features. In GPON, bandwidth map allocations do not necessarily include ONU identifier information, but an ONU identifier is used as an allocation identifier for a bandwidth map allocation that requests a PLOAMu. Because the GPON specification can require an optical line terminal 102 to periodically request a PLOAMu from each optical network unit 104a-104n, this can be used in some implementations as a starting point by the burst feature matcher 412 for matching to actual upstream features. In these implementations, the burst feature matcher 412 can identify an expected PLOAMu feature and its ONU identifier as the first feature in the mapping 502. As the collection 504 of actual features is generated over time, the burst feature matcher 412 can observe the actual features until a PLOAMu feature with the correct ONU identifier in found in a specific burst's burst header. From there, the burst feature matcher 412 may observe additional features over time to verify correctness. Here, correctness in the actual features may be defined when only burst starts (which are defined as the first byte of each burst header) occur in expected locations. An exception to this might be during ranging and serial number acquisition phases, during which burst arrival times cannot be predicted. Incorrectness of actual features may not include burst starts that are never observed.

Because of some impediments, this example implementation might need to account for the fact that a PLOAMu request from the optical line terminal 102 may never be observed in the upstream direction 114 by the fiber optic test device 116. In some embodiments, the fiber optic test device 116 may keep track of whether a PLOAMu feature and its attendant ONU identifier requested by the optical line terminal 102 has been observed in the actual features 410 detected by the burst feature detector 408. In particular embodiments, to accomplish this, a timeout can be implemented to indicate that an adequately-long period of time has elapsed before alignment is reached during which no PLOAMu with the ONU identifier has been observed in the actual features 410. At this point, the burst feature extractor 404 might use a PLOAMu request with a different ONU identifier as its starting point. These example implementations may therefore be designed to use only burst start and PLOAMu features, and the burst feature matcher 412 can compare this subset of expected features 406 with the actual features 410 using the definition of correctness identified previously until alignment occurs.

Figure 7:
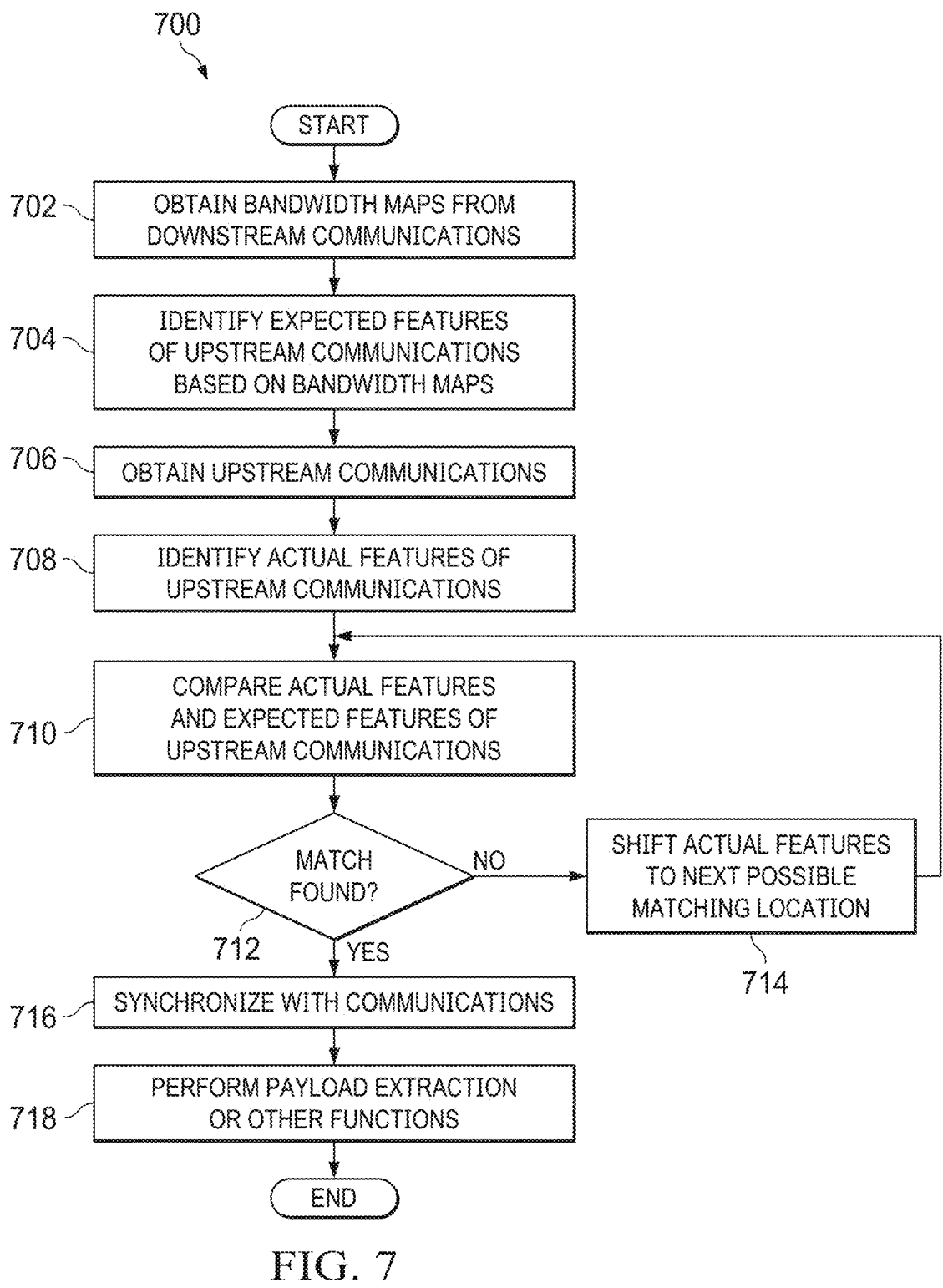
FIG. 7 illustrates an example method for signal synchronization and payload extraction in a gigabit passive optical network or other network according to this disclosure.

FIG. 7 illustrates an example method 700 for signal synchronization and payload extraction in a gigabit passive optical network or other network according to this disclosure. For ease of explanation, the method 700 is described as being performed by the fiber optic test device 116 in the system 100 of FIG. 1, where the fiber optic test device 116 has the configuration and structure shown in FIGS. 4A and 4B. However, the method 700 may be performed by any other suitable device and in any other suitable system.

As shown in FIG. 7, one or more bandwidth maps are obtained from downstream communications at step 702. This may include, for example, the processing device 452 of the fiber optic test device 116 using the bandwidth map extractor 402 to analyze the stream of downstream bits 112' in order to identify one or more bandwidth maps 208a-208c contained in the downstream bits 112'. Expected features of upstream communications are identified based on the one or more bandwidth maps at step 704. This may include, for example, the processing device 452 of the fiber optic test device 116 using the burst feature extractor 404 to analyze the one or more bandwidth maps 208a-208c and identify expected features 406 of the upstream communications. As noted above, the expected features 406 may include various types of features and time slots when the features are expected to be received. Specific examples of the types of features that may be received might include start of frame features, PLOAMu features, DBRu features, and GEM features.

Upstream communications are obtained at step 706, and actual features of the upstream communications are identified at step 708. This may include, for example, the processing device 452 using the burst feature detector 408 to analyze the stream of upstream bits 114' in order to identify actual features 410 of the upstream bits 114'. The actual features 410 may include various types of features and time slots when the features are actually received. Specific examples of the types of features that may be received might include start of frame features, PLOAMu features, DBRu features, and GEM features.

The actual and expected features of the upstream communications are compared at step 710, and a determination is made whether a match is found at step 712. This may include, for example, the processing device 452 using the burst feature matcher 412 to determine if a collection 504 of the actual features 410 of the upstream bits 114' matches the expected features 406. If not, the actual features of the upstream communications are shifted to the next possible matching location at step 714. This may include, for example, the processing device 452 using the burst feature matcher 412 to shift the collection 504 of actual features 410 of the upstream bits 114' to the next instance where the first actual feature 410 matches the first expected feature 406. The process can return to step 710 to compare the actual and expected features again.

Otherwise, if a match is found, synchronization with the upstream communications can be achieved at step 716, and payload extraction or other function(s) may be performed based on the synchronization at step 718. This may include, for example, the processing device 452 using the burst feature matcher 412 to output the upstream bits 114' with correctly-labeled features. This may also include the processing device 452 performing payload extraction or other functions based on the upstream bits 114' with the correctly-labeled features. For instance, the upstream bits 114' with the correctly-labeled features can be used to identify the bursts 308 and to extract payload data from the bursts 308. Note that achieving synchronization here may involve determining an initial match of features and gaining improved confidence in the initial match overtime, such as when confidence increases as more and more features match over time.

Although FIG. 7 illustrates one example of a method 700 for signal synchronization and payload extraction in a gigabit passive optical network or other network, various changes may be made to FIG. 7. For example, while shown as a series of steps, various steps in FIG. 7 may overlap, occur in parallel, occur in a different order, or occur any number of times. As a particular example, steps 702-704 may overlap with steps 706-708 so that the expected features 406 and the actual features 410 can be identified in a parallel or substantially overlapping manner.

The following describes example embodiments of this disclosure that implement or relate to signal synchronization and payload extraction in a gigabit passive optical network (GPON) or other network. However, other embodiments may be used in accordance with the teachings of this disclosure.

In a first embodiment, a method includes obtaining, at a specified device, one or more bandwidth maps contained in communications in a first direction along a transmission medium. Each bandwidth map identifies when one or more other devices are allowed to communicate in a second direction opposite the first direction along the transmission medium. The method also includes using the one or more bandwidth maps to identify expected features of communications from the one or more other devices in the second direction along the transmission medium. The method further includes identifying actual features of the communications from the one or more other devices in the second direction along the transmission medium. In addition, the method includes synchronizing the specified device with the communications from the one or more other devices using the expected and actual features.

In a second embodiment, an apparatus includes at least one interface configured to be coupled to a transmission medium. The apparatus also includes at least one processing device configured to obtain one or more bandwidth maps contained in communications in a first direction along the transmission medium. Each bandwidth map identifies when one or more other devices are allowed to communicate in a second direction opposite the first direction along the transmission medium. The at least one processing device is also configured to use the one or more bandwidth maps to identify expected features of communications from the one or more other devices in the second direction along the transmission medium. The at least one processing device is further configured to identify actual features of the communications from the one or more other devices in the second direction along the transmission medium. In addition, the at least one processing device is configured to synchronize with the communications from the one or more other devices using the expected and actual features.

In a third embodiment, a non-transitory machine readable medium contains instructions that when executed cause at least one processor to obtain one or more bandwidth maps contained in communications in a first direction along a transmission medium. Each bandwidth map identifies when one or more other devices are allowed to communicate in a second direction opposite the first direction along the transmission medium. The non-transitory machine readable medium also contains instructions that when executed cause the at least one processor to use the one or more bandwidth maps to identify expected features of communications from the one or more other devices in the second direction along the transmission medium. The non-transitory machine readable medium further contains instructions that when executed cause the at least one processor to identify actual features of the communications from the one or more other devices in the second direction along the transmission medium. In addition, the non-transitory machine readable medium contains instructions that when executed cause the at least one processor to synchronize with the communications from the one or more other devices using the expected and actual features.

Any single one or any suitable combination of the following features may be used with the first, second, or third embodiment. Synchronization with the communications from the one or more other devices may be achieved by comparing the expected features to a collection of the actual features, shifting the collection of the actual features in response to determining that at least some of the expected and actual features do not match, and comparing the expected features to the shifted collection of the actual features. Each bandwidth map may be associated with a frame in the first direction and may identify (i) at least one of the one or more other devices allowed to communicate in a corresponding frame in the second direction and (ii) at least one time slot in which the at least one of the one or more other devices is allowed to communicate in the corresponding frame. At least some of the expected features may be based on the at least one time slot from the one or more bandwidth maps. Bits associated with the communications from the one or more other devices may be labeled with tags identifying correct features. Payload extraction of data contained in the communications from the one or more other devices may be performed. Synchronization with the communications from the one or more other devices may be achieved without using range information from the specified device to the one or more other devices. The transmission medium may include at least one optical fiber, the one or more other devices may include one or more optical network units configured to communicate with an optical line terminal over the at least one optical fiber, the first direction may be associated with transmissions from the optical line terminal to the one or more optical network units, and the second direction may be associated with transmissions from the one or more optical network units to the optical line terminal.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining, at a specified device, one or more bandwidth maps contained in communications in a first direction along a transmission medium, each bandwidth map identifying when one or more other devices are allowed to communicate in a second direction opposite the first direction along the transmission medium;
using the one or more bandwidth maps to identify expected features of communications from the one or more other devices in the second direction along the transmission medium;
identifying actual features of the communications from the one or more other devices in the second direction along the transmission medium;
synchronizing the specified device with the communications from the one or more other devices using the expected and actual features; and
labeling bits associated with the communications from the one or more other devices with tags identifying correct features.

2. The method of claim 1, wherein synchronizing the specified device with the communications from the one or more other devices comprises:
comparing the expected features to a collection of the actual features;
in response to determining that at least some of the expected and actual features do not match, shifting the collection of the actual features; and
comparing the expected features to the shifted collection of the actual features.

3. The method of claim 1, wherein:
each bandwidth map is associated with a frame in the first direction and identifies (i) at least one of the one or more other devices allowed to communicate in a corresponding frame in the second direction and (ii) at least one time slot in which the at least one of the one or more other devices is allowed to communicate in the corresponding frame; and
at least some of the expected features are based on the at least one time slot from the one or more bandwidth maps.

4. The method of claim 1, wherein labeling the bits comprises generating the tags identifying the correct features after the actual features are aligned with the expected features.

5. The method of claim 1, further comprising:
performing payload extraction of data contained in the communications from the one or more other devices.

6. The method of claim 1, wherein synchronizing the specified device with the communications from the one or more other devices comprises:
synchronizing the specified device with the communications from the one or more other devices without using range information from the specified device to the one or more other devices.

7. The method of claim 1, wherein:
the transmission medium comprises at least one optical fiber;

the one or more other devices comprise one or more optical network units configured to communicate with an optical line terminal over the at least one optical fiber;

the first direction is associated with transmissions from the optical line terminal to the one or more optical network units; and the second direction is associated with transmissions from the one or more optical network units to the optical line terminal.

8. An apparatus comprising:

at least one interface configured to be coupled to a transmission medium; and at least one processing device configured to:

obtain one or more bandwidth maps contained in communications in a first direction along the transmission medium, each bandwidth map identifying when one or more other devices are allowed to communicate in a second direction opposite the first direction along the transmission medium;

use the one or more bandwidth maps to identify expected features of communications from the one or more other devices in the second direction along the transmission medium;

identify actual features of the communications from the one or more other devices in the second direction along the transmission medium; and synchronize with the communications from the one or more other devices using the expected and actual features;

wherein, to synchronize with the communications from the one or more other devices, the at least one processing device is configured to:

compare the expected features to a collection of the actual features;

in response to determining that at least some of the expected and actual features do not match, shift the collection of the actual features; and compare the expected features to the shifted collection of the actual features.

9. The apparatus of claim 8, wherein the at least one processing device is configured to repeatedly compare the expected features to the collection of the actual features, shift the collection of the actual features, and compare the expected features to the shifted collection of the actual features until the actual features align with the expected features.

10. The apparatus of claim 8, wherein:

each bandwidth map is associated with a frame in the first direction and identifies (i) at least one of the one or more other devices allowed to communicate in a corresponding frame in the second direction and (ii) at least one time slot in which the at least one of the one or more other devices is allowed to communicate in the corresponding frame; and at least some of the expected features are based on the at least one time slot from the one or more bandwidth maps.

11. The apparatus of claim 8, wherein the at least one processing device is further configured to label bits associated with the communications from the one or more other devices with tags identifying correct features.

12. The apparatus of claim 8, wherein the at least one processing device is further configured to perform payload extraction of data contained in the communications from the one or more other devices.

13. The apparatus of claim 8, wherein the at least one processing device is configured to synchronize with the communications from the one or more other devices without using range information from the apparatus to the one or more other devices.

14. The apparatus of claim 8, wherein:

the transmission medium comprises at least one optical fiber;

the one or more other devices comprise one or more optical network units configured to communicate with an optical line terminal over the at least one optical fiber;

the first direction is associated with transmissions from the optical line terminal to the one or more optical network units; and the second direction is associated with transmissions from the one or more optical network units to the optical line terminal.

15. A non-transitory machine readable medium containing instructions that when executed cause at least one processor to:

obtain one or more bandwidth maps contained in communications in a first direction along a transmission medium, each bandwidth map identifying when one or more other devices are allowed to communicate in a second direction opposite the first direction along the transmission medium;

use the one or more bandwidth maps to identify expected features of communications from the one or more other devices in the second direction along the transmission medium;

identify actual features of the communications from the one or more other devices in the second direction along the transmission medium; and synchronize with the communications from the one or more other devices using the expected and actual features;

wherein the instructions that when executed cause the at least one processor to synchronize with the communications from the one or more other devices comprise instructions that when executed cause the at least one processor to:

compare the expected features to a collection of the actual features;

in response to determining that at least some of the expected and actual features do not match, shift the collection of the actual features; and compare the expected features to the shifted collection of the actual features.

16. The non-transitory machine readable medium of claim 15, wherein the instructions when executed cause the at least one processor to compare the expected features to the collection of the actual features, shift the collection of the actual features, and compare the expected features to the shifted collection of the actual features until the actual features align with the expected features.

17. The non-transitory machine readable medium of claim 15, wherein:

each bandwidth map is associated with a frame in the first direction and identifies (i) at least one of the one or more other devices allowed to communicate in a corresponding frame in the second direction and (ii) at least one time slot in which the at least one of the one or more other devices is allowed to communicate in the corresponding frame; and at least some of the expected features are based on the at least one time slot from the one or more bandwidth maps.

18. The non-transitory machine readable medium of claim 15, further containing instructions that when executed cause the at least one processor to at least one of:

label bits associated with the communications from the one or more other devices with tags identifying correct features; and perform payload extraction of data contained in the communications from the one or more other devices.

19. The non-transitory machine readable medium of claim 15, wherein the instructions when executed cause the at least one processor to synchronize with the communications from the one or more other devices without using range information to the one or more other devices.

20. The non-transitory machine readable medium of claim 15, wherein:

the transmission medium comprises at least one optical fiber;

the one or more other devices comprise one or more optical network units configured to communicate with an optical line terminal over the at least one optical fiber;

the first direction is associated with transmissions from the optical line terminal to the one or more optical network units; and the second direction is associated with transmissions from the one or more optical network units to the optical line terminal.

\* \* \* \* \*